(12) United States Patent
Dierks et al.

(10) Patent No.: US 9,598,173 B2
(45) Date of Patent: Mar. 21, 2017

(54) TOW PLATE AND AVC HOUSING

(71) Applicant: Contract Fabrication and Design, Princeton, TX (US)

(72) Inventors: David A. Dierks, McKinney, TX (US); Russell Mensch, Allen, TX (US); Chris Kniffin, Arlington, TX (US); Mike Fellegy, Gordonville, TX (US)

(73) Assignee: CFD International, LLC, Princeton, TX (US)

( * ) Notice: Subject to any disclaimer, the term of this patent is extended or adjusted under 35 U.S.C. 154(b) by 0 days.

(21) Appl. No.: 15/090,076

(22) Filed: Apr. 4, 2016

(65) Prior Publication Data
US 2016/0304203 A1    Oct. 20, 2016

Related U.S. Application Data

(60) Provisional application No. 62/142,324, filed on Apr. 2, 2015.

(51) Int. Cl.
B64D 7/00 (2006.01)
B64D 7/02 (2006.01)
F41A 9/79 (2006.01)

(52) U.S. Cl.
CPC . *B64D 7/02* (2013.01); *F41A 9/79* (2013.01)

(58) Field of Classification Search
CPC ................. F41A 9/34; F41A 9/79; B64D 7/02
USPC ......................................... 89/37.16
See application file for complete search history.

(56) References Cited

U.S. PATENT DOCUMENTS 6,250,197 B1 * 6/2001 Sanderson ............... B64D 7/02
                                                         89/37.16
6,286,411 B1 * 9/2001 Sanderson ............. F41A 23/20
                                                         89/37.03

* cited by examiner

*Primary Examiner* — Samir Abdosh
(74) *Attorney, Agent, or Firm* — Robert C. Klinger

(57) ABSTRACT

A tow plate and active vibration control (AVC) housing configured to couple to a helicopter sponson about an AVC and support a gun mounting system.

5 Claims, 6 Drawing Sheets

TOW PLATE AND AVC HOUSING

CLAIM OF PRIORITY

This application claims priority of U.S. Provisional Application Ser. No. 62/142,324 entitled Tow Plate and AVC Housing filed Apr. 2, 2015, the teachings of which are incorporated herein in its entirety.

TECHNICAL FIELD

This disclosure provides a tow plate and an active vibration control (AVC) housing, such as for use as an adapter to support a gun mounting system on a helicopter.

BACKGROUND

Certain helicopters, such as the H-60M, are outfitted with AVCs on a sponson plate of a sponson, which prevents gun mounts from being directly attached to the sponson plate.

SUMMARY OF THE DISCLOSURE

A tow plate and active vibration control (AVC) housing configured to couple to a helicopter sponsors about an AVC and support a gun mounted system.

DETAILED DESCRIPTION

Figure 1:
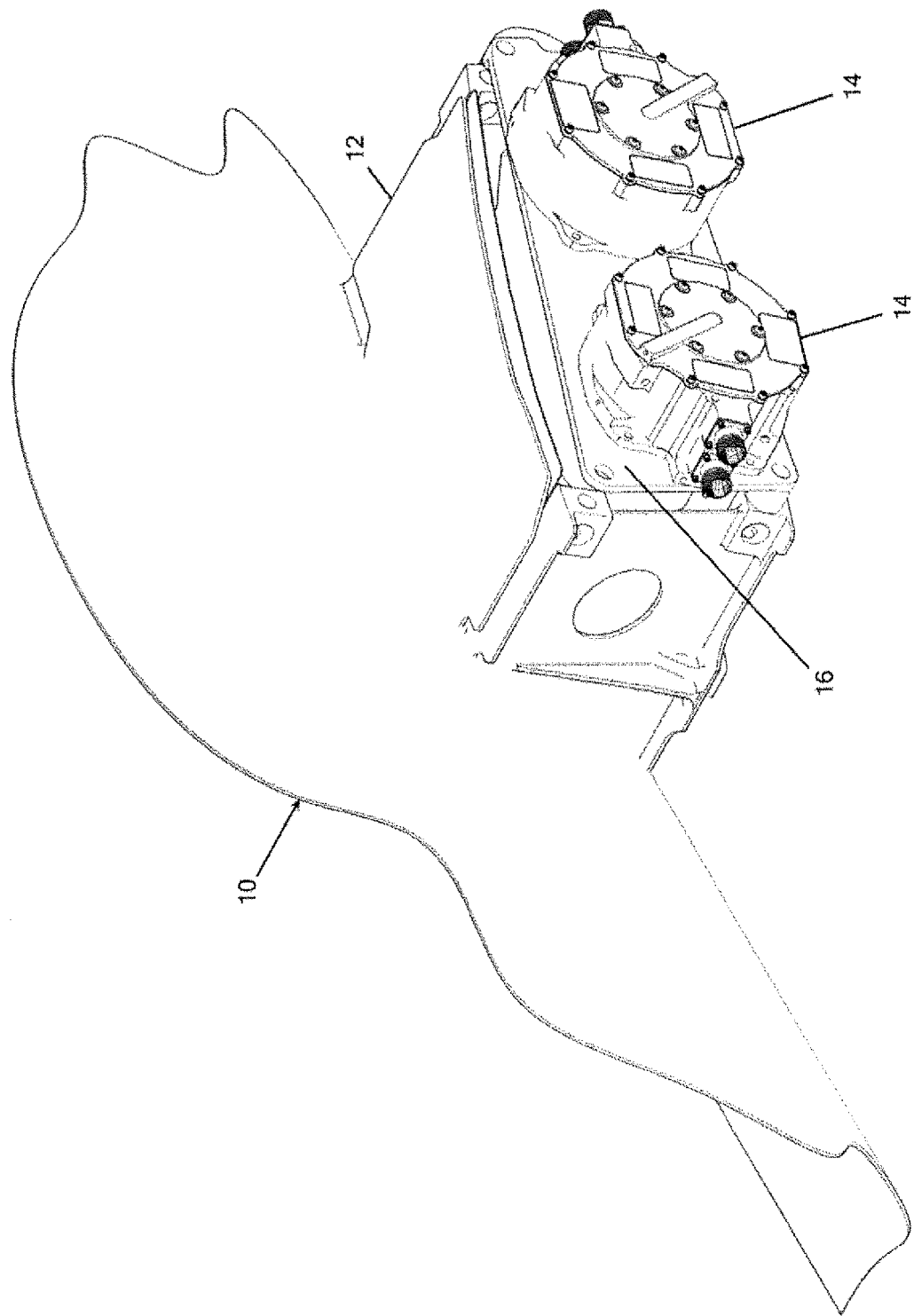
FIG. 1 illustrates a perspective view of a helicopter frame including a sponson having AVCs coupled to a plate on an end surface of the sponson.

FIG. 1 illustrates a perspective view of a helicopter frame 10 of a helicopter, such as a H-60M helicopter. A sponson 12 is secured to the helicopter frame 10 and includes active vibration controls (AVCs) 14 coupled to plate 16 on an end surface of the sponson 12.

Figure 2:
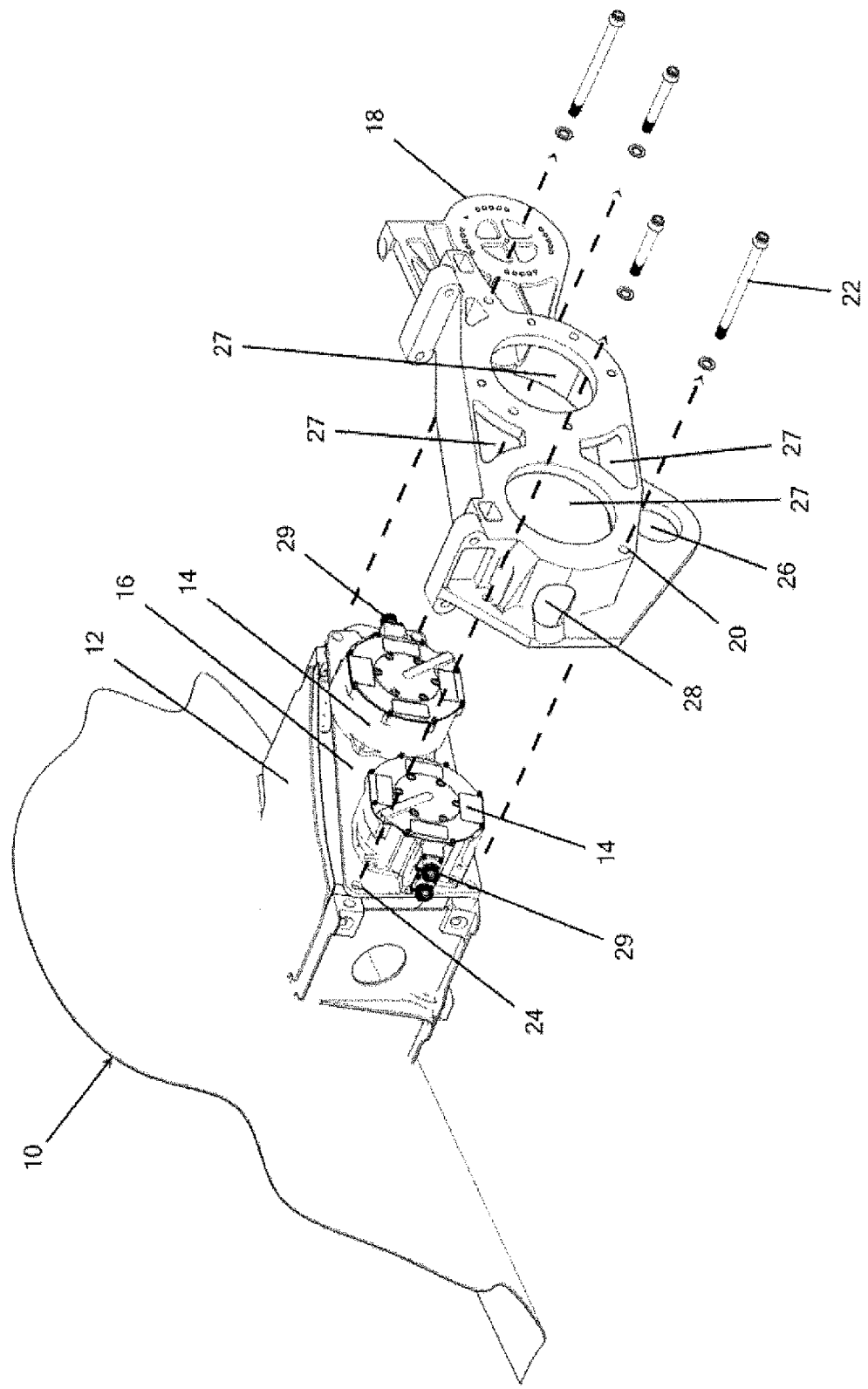
FIG. 2 illustrates an exploded view of the helicopter frame having the sponson and a tow plate/AVC housing mounted to the plate on the end surface of the sponson to encapsulate the AVCs and to provide a mounting support for a gun mounted system.

FIG. 2 illustrates an exploded view of the helicopter frame 10 having sponson 12, and a tow plate/AVC housing 18 configured to mount to the plate 16 on the end surface of the sponson. The tow plate/AVC housing 18 encapsulates the AVCs 14 to provide a mounting support for a gun mounting system according to this disclosure. The original equipment manufacturer (OEM) end surface of the sponson 12 in prior designs included the plate but did not include the AVCs 14, and previous gun mounted systems were configured to replace the plate on the end of the sponson 12.

The tow plate/AVC housing 18 is configured as an adapter, allowing an existing gun mounting system that was fully compliant with the prior OEM helicopter design to be mounted to the new OEM helicopter design including the AVCs 14. The tow plate/AVC housing 18 has a plurality of mounting holes 20 configured to receive fasteners 22 extending therethrough and secured to corresponding holes 24 in the plate 16. The tow plate/AVC housing 18 has a forwardly located opening 26 provided below the AVCs 14, and configured to provide an attachment point for towing the helicopter. The AVC housing 18 has cut-out portions 27 in a side surface thereof configured to reduce weight while providing structural integrity. The tow plate/AVC housing 18 further includes openings 28 defined in a front side surface thereof configured as a clearance to provide access for electrical cables (not shown) to connectors 29 of the AVCs 14. The tow plate/AVC housing 18 is a H-60M fully compliant design that requires no modifications to the OEM design of the helicopter, or a gun mounting system.

Figure 3:
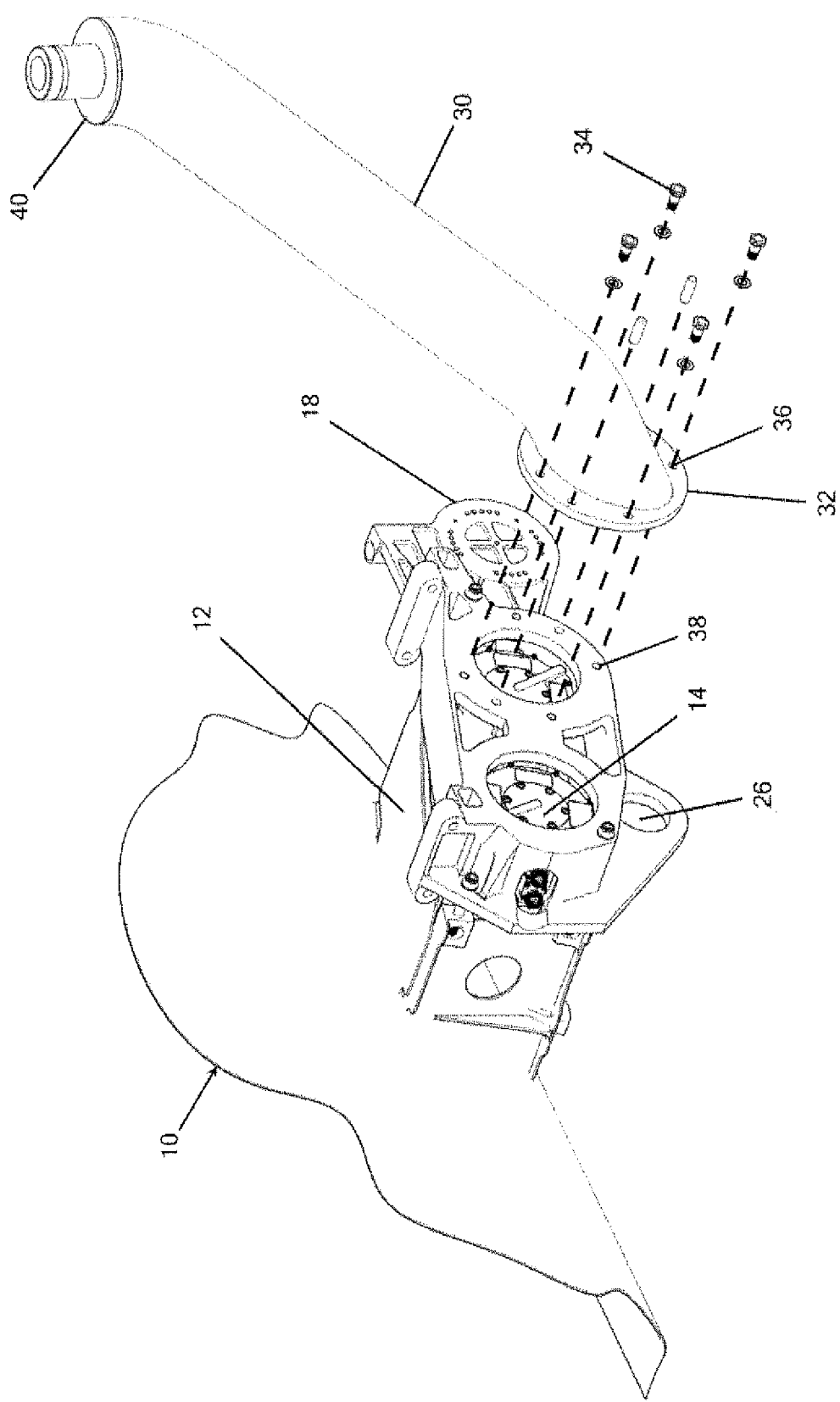
FIG. 3 illustrates the tow plate/AVC housing secured to the plate of the sponson, and an upwardly extending tubular pintle arm having a lower end configured to be mounted to a center portion of the tow plate/AVC housing.

FIG. 3 illustrates the tow plate/AVC housing 18 secured to the plate 16 of the sponson 12, and an upwardly extending tubular pintle arm 30 having a lower end 32 configured to be mounted to a center portion of the tow plate/AVC housing 18, over the rearward opening 27. A plurality of fasteners 34 extend through holes 36 defined in the periphery of the lower end 32 and into corresponding holes 38 defined in the center portion of the tow plate/AVC housing 18, as shown. The pintle arm 30 has an upper end 40 configured to couple to and support a gun mounting system (not shown), such as an EGMS system manufactured by Contract Fabrication & Design International of Princeton, Tex.

Figure 4:
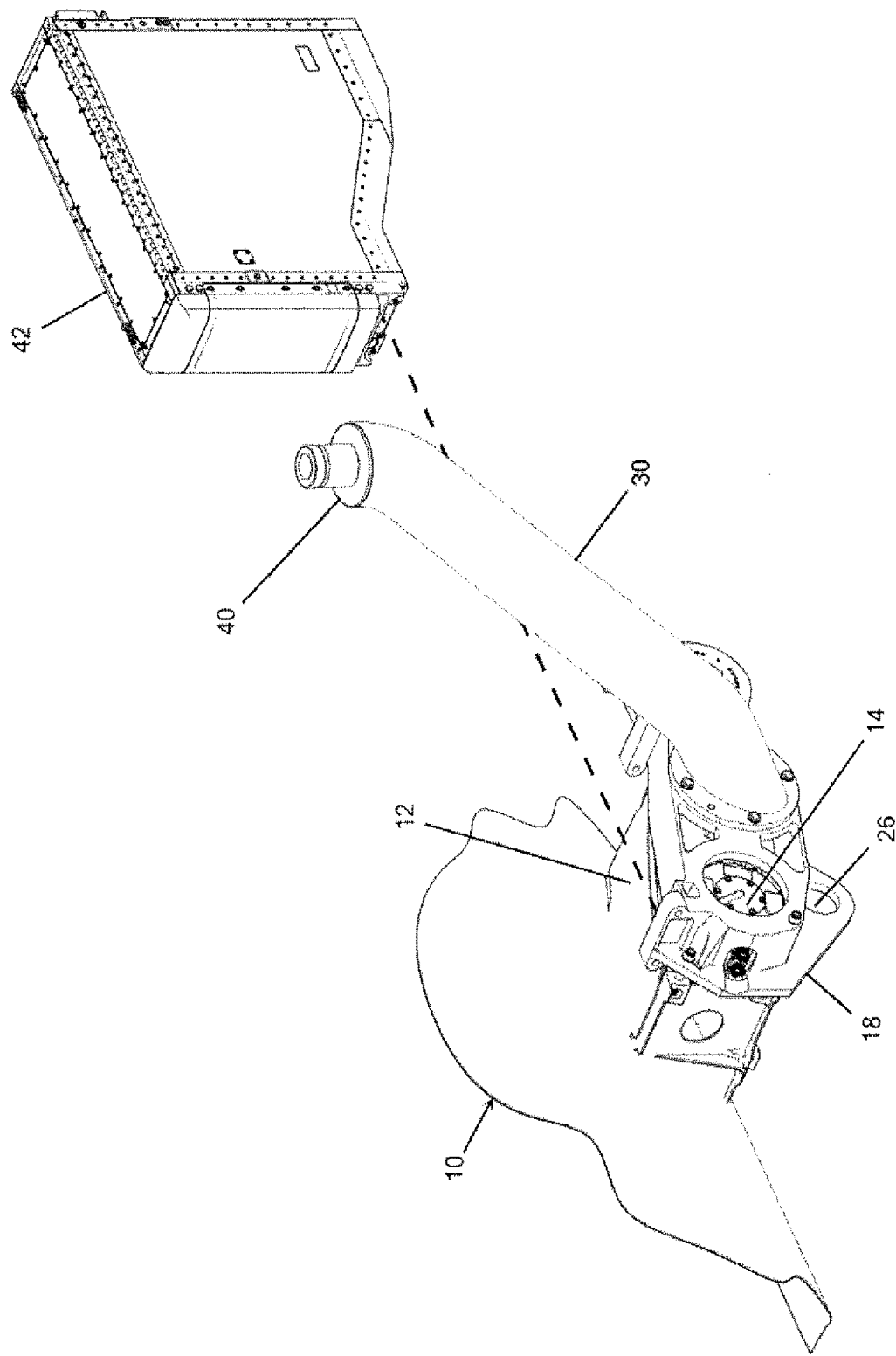
FIG. 4 illustrates an exploded view of an ammunition can configured to be mounted to the tow plate/AVC housing and on top of the sponson, in between the helicopter frame and the pintle arm.

FIG. 4 illustrates an exploded view of an ammunition can 42 configured to be mounted to the tow plate/AVC housing 18 and on top of the sponson 12, in between the helicopter frame 10 and the pintle arm 30, as shown.

Figure 5:
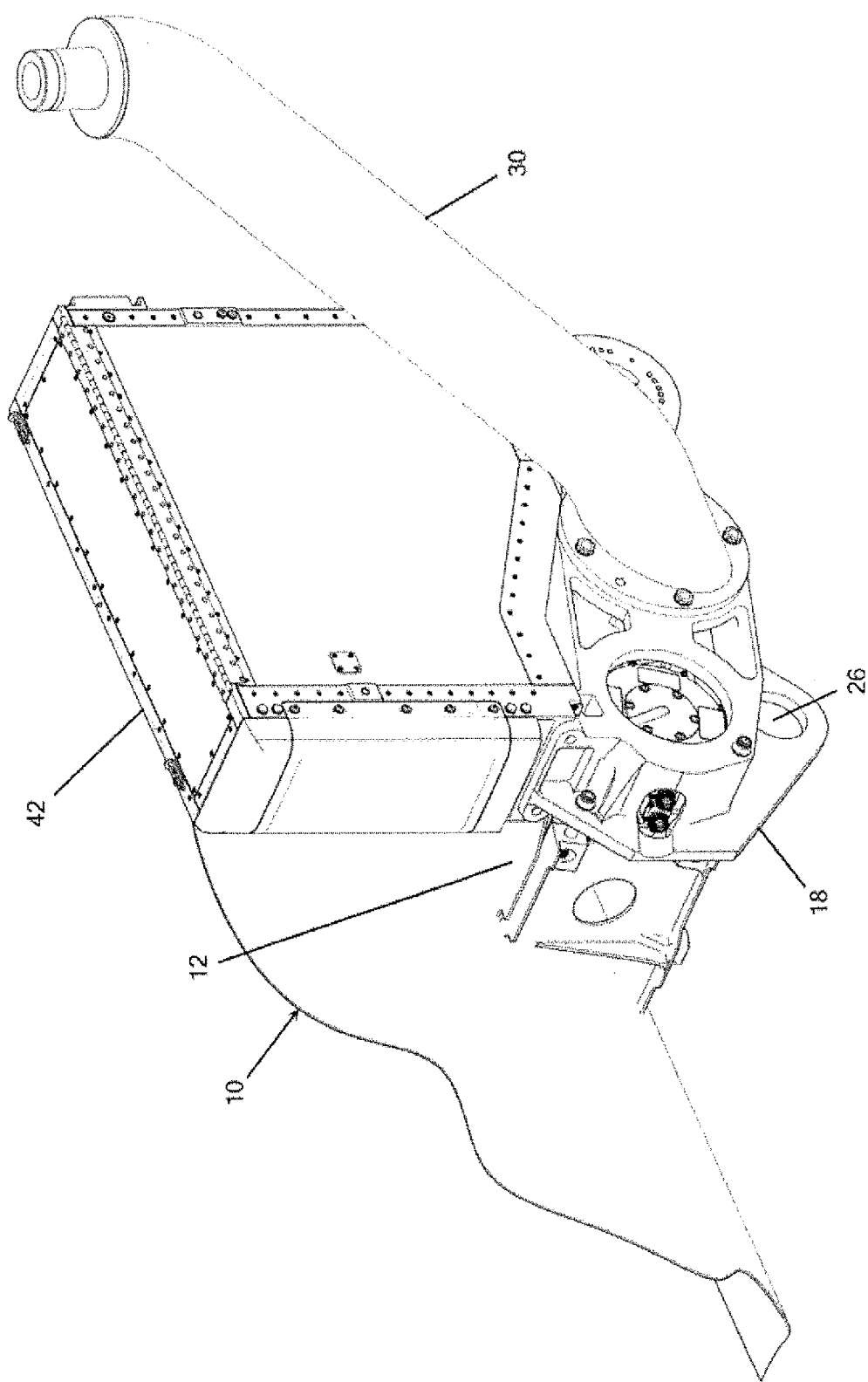
FIG. 5 illustrates a perspective view of the ammunition can mounted to the tow plate/AVC housing.

FIG. 5 illustrates a perspective view of the ammunition can 42 mounted to the tow plate/AVC housing 18.

Figure 6:
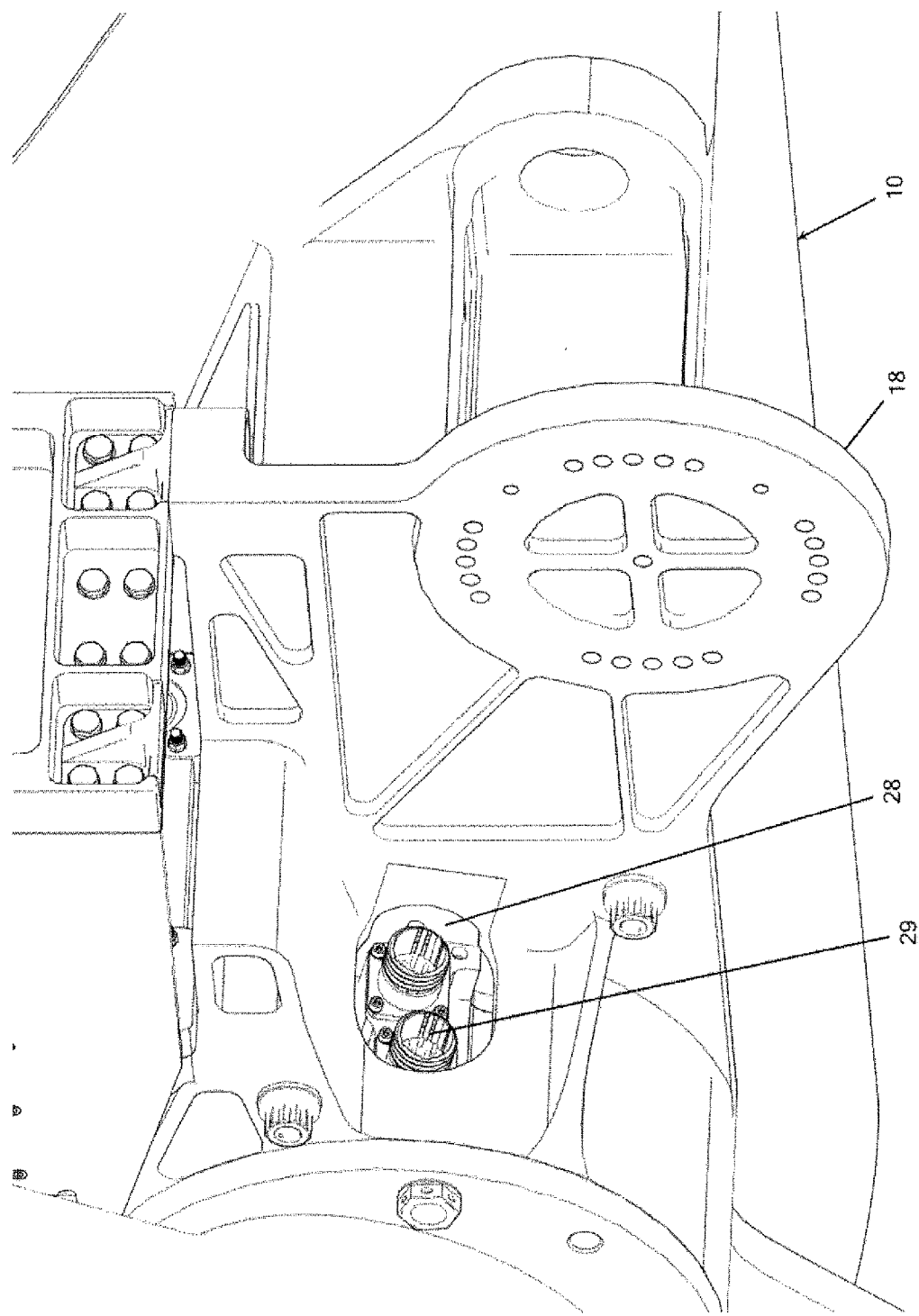
FIG. 6 illustrates a rear view of the tow plate/AVC housing secured to the helicopter frame.

FIG. 6 illustrates a rear view of the tow plate/AVC housing 18 secured to the helicopter frame 10.

Though the invention has been described with respect to a specific preferred embodiment, many variations and modifications will become apparent to those skilled in the art upon reading the present application. The intention is therefore that the appended claims be interpreted as broadly as possible in view of the prior art to include all such variations and modifications.

What is claimed:

1. A tow plate and active vibration control (AVC) housing configured to couple to a helicopter sponson about an AVC and support a gun mounting system, wherein the housing is configured to encapsulate the AVC, wherein the housing comprises a first opening configured to provide access to an electrical connector of the AVC.

2. The tow plate and AVC housing as specified in claim 1 wherein the AVC is configured to couple to an H-60M helicopter.

3. The tow plate and AVC housing as specified in claim 1 wherein the housing comprises at least one second opening configured to provide access to the AVC.

4. A tow plate and active vibration control (AVC) housing configured to couple to a helicopter sponson about an AVC and support a gun mounting system, wherein the housing is configured to encapsulate the AVC, wherein the housing is configured to mount to a H-60M helicopter using fasteners and without requiring any modification of the AVC.

5. The tow plate and AVC housing as specified in claim 1 wherein the gun mounting system comprises a pintle arm.

* * * * *